United States Patent
Hill (10) Patent No.: US 11,421,300 B2
(45) Date of Patent: Aug. 23, 2022

(54) BENEFICIATION PROCESS FOR ENHANCING URANIUM MINERAL PROCESSING

(71) Applicant: URANIUM BENEFICIATION PTY LTD, Waterford WA (AU)

(72) Inventor: Murray Philip Hill, Booragoon WA (AU)

(73) Assignee: Uranium Beneficiation Pty Ltd, West Perth (AU)

( * ) Notice: Subject to any disclaimer, the term of this patent is extended or adjusted under 35 U.S.C. 154(b) by 553 days.

(21) Appl. No.: 15/999,099

(22) PCT Filed: Feb. 15, 2017

(86) PCT No.: PCT/AU2017/000043
§ 371 (c)(1),
(2) Date: Aug. 16, 2018

(87) PCT Pub. No.: WO2017/139829
PCT Pub. Date: Aug. 24, 2017

(65) Prior Publication Data
US 2020/0354813 A1 Nov. 12, 2020

(30) Foreign Application Priority Data
Feb. 15, 2016 (WO) ................ PCT/AU2016/000040

(51) Int. Cl.
*C22B 60/02* (2006.01)
*C22B 3/22* (2006.01)
(Continued)

(52) U.S. Cl.
CPC ............ *C22B 60/0252* (2013.01); *B03B 5/34* (2013.01); *B03B 7/00* (2013.01); *B03B 9/00* (2013.01);
(Continued)

(58) Field of Classification Search
None
See application file for complete search history.

(56) References Cited

U.S. PATENT DOCUMENTS 2,813,003 A * 11/1957 Thunaes ............. C22B 60/0247
423/17
2,968,524 A  1/1961 Seeton
(Continued)

FOREIGN PATENT DOCUMENTS

DE  2039563 A1 *  2/1972 ............... B03D 3/00
DE  2830979 A1  1/1980
(Continued)

OTHER PUBLICATIONS

Pryor, E. J. "Principles of froth flotation." Mineral Processing. Springer, Dordrecht, 1965. Chapters 17 and 19 (Year: 1965).*
(Continued)

*Primary Examiner* — Anthony M Liang
(74) *Attorney, Agent, or Firm* — Blank Rome LLP (57) ABSTRACT

The invention relates to a beneficiation process for uranium ores comprising clay and carbonate minerals, the process comprising: performing a hydrocyclone step to obtain a hydrocyclone underflow fraction substantially comprising the uranium component; treating the hydrocyclone underflow fraction to effect a separation of carbonate and uranium minerals; and recovering the uranium-bearing minerals to produce a uranium concentrate.

19 Claims, 5 Drawing Sheets

(51) Int. Cl.
   B03B 5/34      (2006.01)
   B03D 1/02      (2006.01)
   B03B 7/00      (2006.01)
   B03B 9/00      (2006.01)
   C22B 1/00      (2006.01)

(52) U.S. Cl.
   CPC ................ B03D 1/02 (2013.01); C22B 1/00 (2013.01); C22B 3/22 (2013.01); C22B 60/0208 (2013.01); C22B 60/0226 (2013.01); B03D 2203/04 (2013.01)

(56) References Cited

U.S. PATENT DOCUMENTS

| | | | | |
|---|---|---|---|---|
| 3,976,251 | A | * | 8/1976 | Gambopoulos ........ B03D 1/011 241/20 |
| 4,026,479 | A | | 5/1977 | Bradburn |
| 5,053,119 | A | * | 10/1991 | Collins .................... B03D 1/02 209/166 |
| 7,111,738 | B2 | | 9/2006 | Allen |
| 8,652,425 | B2 | | 2/2014 | Bassil |
| 9,718,066 | B2 | | 8/2017 | Hartmann |
| 2004/0164005 | A1 | | 8/2004 | Allen, III |
| 2012/0209550 | A1 | | 8/2012 | Van Der Spek |
| 2013/0270475 | A1 | * | 10/2013 | Lazzaro ................. B03D 1/008 252/61 |
| 2016/0008822 | A1 | | 1/2016 | Hartmann |
| 2016/0207050 | A1 | | 7/2016 | Van Der Spek |
| 2020/0354813 | A1 | | 11/2020 | Hill |
| 2021/0023570 | A1 | | 1/2021 | Maron |

FOREIGN PATENT DOCUMENTS

| | | |
|---|---|---|
| GB | 827443 A | 2/1960 |
| RU | 2565625 C1 | 10/2015 |
| WO | WO 2006/024886 A1 | 3/2006 |

OTHER PUBLICATIONS

Liu, Y., and Q. Liu. "Flotation separation of carbonate from sulfide minerals, I: Flotation of single minerals and mineral mixtures." Minerals engineering 17.7-8 (2004): 855-863. (Year: 2004).*
International Search Report and Written Opinion issued in corresponding International Application No. PCT/AU2017/000043 dated Mar. 20, 2017.
Translated figure 1 for DE 2830979, 1 page.
International Search Report and Written Opinion for PCT/AU2016/000040, dated May 18, 2016, 4 pgs.

* cited by examiner

BENEFICIATION PROCESS FOR ENHANCING URANIUM MINERAL PROCESSING

This application claims priority from PCT Application No PCT/AU2016/000040, filed 15 Feb. 2016, the entire contents of which are hereby incorporated by cross-reference.

TECHNICAL FIELD

The present invention relates broadly to a beneficiation process for uranium ores. More particularly, the invention relates to a uranium beneficiation process comprising a hydrocyclone step to reject fine gangue material in order to improve the subsequent separation of carbonate minerals from the uranium minerals.

BACKGROUND

Physical beneficiation of low grade ores to yield a higher grade product as feedstock for further downstream processing is a key component of many metallurgical operations. The format of the overall physical beneficiation process, which may consist of more than one individual but integrated unit steps, is typically designed to maximise a number of positive technical and economic outcomes when the processing flowsheet is considered in detail as a whole.

Regardless of the mineralogical complexity and number of target minerals of an ore, the format of the physical beneficiation process is primarily concerned with achieving the optimum balance between the grade of the beneficiation product(s) and the overall recovery of the target mineral(s) into the beneficiation product(s). This balance is especially relevant for lower grade and more complex ores, and more especially ores that contain one or more target minerals.

Uranium ores and concentrates are typically leached under either alkaline or acidic conditions to recover the uranium, the choice of leachant being a direct consequence of the uranium mineralogy, and more particularly the mineralogy and relative proportions of the matrix of gangue minerals. For some run-of-mine uranium ores the grade and mineralogy are such that pre-leach treatment is limited to crushing and agglomeration for heap leaching, or crushing and wet grinding for conventional tank leaching.

The capital and operating costs associated with the downstream processing of a high grade uranium concentrate are considerably more advantageous than those applicable to treating a higher volume of a low grade ore to achieve the same overall recovery of uranium minerals.

Traditionally, processes for the beneficiation of uranium ores have either involved the use of methods such as gravity separation, magnetic separation, radiometric sorting or the rejection of coarse size fractions in order to produce a higher uranium grade feed stock for leaching.

Although it is known that hydrocyclones can be used to beneficiate uranium ores, such methods have only been used to recover uranium minerals in the fine fraction (i.e., the material that reports in the hydrocyclone overflow) with rejection of the coarse material (La, the material that reports in the hydrocyclone underflow). For example, U.S. Pat. No. 2,968,524 describes the use of a conventional jig to produce a coarse uranium concentrate and the use of a spiral or a table classifier to produce a finer size heavy mineral concentrate. The low specific gravity material from the spiral or a table classifier is then passed through a hydrocyclone, with the underflow (coarse material) being rejected and the overflow (fine material that contains most of the uranium values) being fed (with other fine or slime materials) to a thickener for concentration prior to further processing. U.S. Pat. No. 2,562,024 relates to a process for recovering vanadium and uranium values from sandstone deposits using agitation to effect attrition of the soft gangue minerals. This is followed by a size separation process to reject coarse material to produce a concentrate having a size smaller than 75 µm or 45 µm, with the vanadium and uranium values reporting in the fines with other fine, gangue material. Thus, U.S. Pat. Nos. 2,968,524 and 2,562,024 both describe a process to reject coarse material and to produce a fine or slime fraction containing uranium values for further processing.

The applicant has previously developed a beneficiation process as described in WO 2014/059461, the entire contents of which are hereby incorporated by cross-reference. WO 2014/059461 describes a process for upgrading uranium from low grade uranium ores in which the uranium is predominantly in the form of well liberated grains.

An example of a low grade ore particularly amenable to the beneficiation process described in WO 2014/059461 are Namibian calcrete deposits, conglomerates of predominantly quartz, carbonate (mostly calcite and less often dolomite) and feldspars within a clay matrix, which typically includes a range of clay minerals. The ores may be broadly characterised as "low-sulphate" or "high-sulphate". Carnotite is the predominant uranium mineral which occurs as liberated particles housed within the clay matrix of low sulphate Namibian ores. Liberated carnotite is typically less prevalent in high sulphate Namibian ores and may be present in varying proportions of the total carnotite mass. In high sulphate Namibian ores, carnotite more typically occurs as composites with a carbonate mineral (most commonly calcite).

Although carnotite is the only uranium mineral identified in Namibian ores to date, the beneficiation process described in WO 2014/059461 is not selective to carnotite only and other secondary uranium minerals in which the uranium minerals present as liberated particles, such as tyuyamunite, may also be recovered using the described process.

For all surficial uranium deposits that occur in semi-arid to arid environments, fine clay minerals and other fine particulate material, together with carbonate minerals, have a detrimental effect on the recovery circuit. Fine particles adversely impact on the processing plant performance preventing good separation of uranium minerals in beneficiation processes and preventing good solid-liquid separation, resulting in reduced uranium recovery at significantly higher cost. In addition, the presence of acid-consuming carbonate minerals (e.g., calcite, dolomite) limits the use of an acid leach circuit to extract uranium and therefore an alkali leach circuit is typically used. However, the use of an alkali leachant is less efficient compared to an acid leach circuit, having the drawbacks of reduced uranium recovery, increased process complexity, increased reagent costs and higher capital and operating costs.

There is a continuing and increasing need for the development of commercially viable processes for upgrading low grade uranium ores, especially ores that contain clay and carbonate minerals that adversely affect uranium mineral recovery and drive the cost of processing higher.

In particular, there is a need for the development of a process which reduces the proportion of carbonate minerals present in a uranium ore to improve the efficacy of downstream processing and uranium recovery.

SUMMARY OF THE INVENTION

The present invention relates to a uranium beneficiation process comprising a hydrocyclone step to reject fine gangue material in order to improve the subsequent separation of carbonate minerals from the uranium minerals.

In a first aspect the present invention relates to a beneficiation process for uranium ore comprising:

performing a hydrocyclone step to produce an underflow fraction and an overflow fraction according to a size separation parameter, wherein the uranium is in particulate form and predominantly reports to the underflow fraction, and the overflow fraction contains fine particulate waste material; and treating the underflow fraction in a separation step to separate carbonate minerals from the uranium minerals.

In a preferred embodiment, the separation step comprises one or more flotation step(s) selected from a carbonate float, a uranium float, a silicate float, or a combination of any two or more thereof. In one embodiment, the flotation step comprises a carbonate float that produces a carbonate concentrate comprising carbonate minerals, and a flotation tail comprising uranium minerals. In a further embodiment, the flotation step comprises a uranium float that produces a uranium concentrate comprising uranium minerals, and a flotation tail comprising carbonate minerals.

In a preferred embodiment, the carbonate mineral comprises calcite, dolomite, siderite, ankerite or any combination thereof. In a particularly preferred embodiment, the carbonate mineral is calcite or dolomite, or a combination thereof.

In a preferred embodiment, the carbonate mineral is calcite and the separation step comprises a calcite float, wherein the uranium minerals predominantly report to the flotation tail. In another embodiment, the carbonate mineral is dolomite and the separation step comprises a dolomite float, wherein the uranium minerals predominantly report to the flotation tail. In an alternative embodiment, the carbonate mineral is dolomite and the separation step is a uranium float, wherein the dolomite reports predominantly to the flotation tail. In a further embodiment, the separation step comprises a silicate float followed by a carbonate or uranium float of the silicate flotation tail.

In other preferred embodiments, the process may comprise a bulk uranium/carbonate float to produce a bulk concentrate comprising uranium minerals and carbonate minerals. The bulk uranium/carbonate float may be followed by a uranium float or a carbonate float of the bulk float concentrate.

In various embodiments, the uranium minerals may occur as liberated grains and/or as composites with carbonate minerals ("uranium/carbonate composites"). Accordingly, in preferred embodiments the process may include one or more grinding step(s) to liberate the uranium minerals from the uranium/carbonate composites to facilitate separation of the uranium minerals and carbonate minerals. In a preferred embodiment, the process comprises a fine grinding step prior to the separation step. In other embodiments, a grinding step may be employed as part of the separation step. For example, in one embodiment the separation step may comprise a carbonate float wherein the resultant carbonate concentrate may be ground according to a fine grinding parameter to liberate uranium minerals from residual uranium/carbonate composites in the concentrate. The ground concentrate may then be recirculated to the carbonate flotation, preferably after being subjected to a cleaner float.

In further embodiments, a grinding step may be employed after a bulk uranium/carbonate float to liberate uranium minerals from uranium/carbonate composites, followed by an optional hydrocyclone step to reject waste fines, followed by a uranium float or a carbonate float of the bulk float concentrate.

DEFINITIONS

Throughout this specification the term "uranium mineral" includes, but is not limited to, secondary or primary uranium minerals or a mixture thereof comprising two or more uranium minerals. Secondary uranium minerals include uranyl vanadates (e.g., carnotite and tyuyamunite) and uranyl phosphates (e.g., torbernite, metatorbernite, autunite and meta-autunite) and uranophane, among others. Primary uranium minerals include uraninite, coffinite, brannerite, davidite and pitchblende, among others. The uranium ore may comprise one, two or more uranium minerals.

Throughout this specification the term "carbonate mineral" refers to calcite, dolomite, siderite, ankerite, and mixtures thereof. Typically a carbonate mineral will be present as a composite with a uranium-bearing mineral, or liberated.

Throughout this specification the expression "uranium/carbonate composites" refers to composites in which uranium mineral is associated with carbonate mineral.

Throughout this specification, the terms "float" or "flotation", as in "carbonate float", "uranium float" and the like, have their ordinary meanings in the field, namely a froth flotation process.

"COF" where used throughout this specification is an abbreviation for "hydrocyclone overflow fraction".

"CUF" where used throughout this specification is an abbreviation for "hydrocyclone underflow fraction".

Throughout this specification the term "about" is used to indicate that a specified value should not be construed as a precise or exact value, and that some variation either side of that value is contemplated and within the intended ambit of the disclosure. Thus, the term "about" reflects tolerances within processes, techniques, equipment and variables known and used in the field where some variation is typical or inevitable and absolute precision according to a stated value is not practical or essential.

In the context of the present invention, the term "predominantly" means "substantially all" or "the majority of", and includes "all".

Throughout this specification, unless the context requires otherwise, the word "comprise", or variations such as "comprises" or "comprising", will be understood to imply the inclusion of a stated element, integer or step, or group of elements, integers or steps, but not the exclusion of any other element, integer or step, or group of elements, integers or steps. In other words, the term comprising is to be construed as "including, but not limited to".

Any discussion of documents, acts, materials, devices, articles or the like which has been included in the present specification is solely for the purpose of providing a context for the present invention. It is not to be taken as an admission that any or all of these matters form part of the prior art base or were common general knowledge in the field relevant to the present invention as it existed before the priority date of each claim of this specification.

DETAILED DESCRIPTION

Recovery of uranium from low grade ores containing carbonate mineral(s) using conventional approaches is generally not practically or economically viable. This is due to the low concentration of uranium in a very large volume of ore comprising a complex mixture of gangue material, including clay and carbonate minerals.

For many uranium ores, clay minerals pose a significant problem with respect to uranium beneficiation. The clay minerals limit the physical separation of other minerals, in particular carbonate minerals and uranium minerals, and result in reduced uranium recovery and high reagent consumption, which adversely impacts the economic viability of beneficiation processes for recovering uranium from such ores.

The present inventor has found that the presence of fine particulate material, e.g., clays, is particularly detrimental to the separation of carbonate minerals from uranium minerals, including separation by flotation. The present inventor has found that removal of these fines enables effective separation of carbonate minerals from uranium minerals. Surprisingly, the present inventor also found that the rejection of fine particulate material, including clays, to waste, can be achieved without resulting in high uranium losses.

Relatively new mineral characterisation technologies (e.g. QEMSCAN which is an abbreviation for Quantitative Evaluation of Minerals by SCANning electron microscopy) coupled with expert sample preparation technologies provided the present inventor with new insights on the deportment of various minerals as a function of particle/agglomerate size within uranium ores. This showed that for many uranium ores, the fine particle size fraction (e.g., particles less than about 5 microns) has a uranium concentration much lower than the mass average. This also showed that the fine particle size fraction contained clay minerals, together with a number of other minerals such as calcite, dolomite, quartz, feldspar, gypsum, celestine, iron oxides, etc.

It was also found that for some ores, while the grain size of the uranium minerals is extremely small, the uranium minerals may be present in the form of composite particles (i.e., the uranium minerals are physically bound with some gangue minerals, such as carbonate minerals, e.g., calcite or dolomite). Thus, even though the grain size of the uranium minerals is extremely small, the uranium minerals will behave as a much larger, composite particle. This finding resulted from establishing a detailed understanding of how the distribution of minerals within a uranium ore varies as a function of particle size and enabled the inventor to devise unit processes to recover the uranium minerals.

During development of the present invention it was found that it was not feasible to use screens to split an aqueous suspension at a fine size, for example at 5 µm, in order to separate fine particulate matter. However, it was found that it is possible to use a relatively standard hydrocyclone to separate the fine particulate material from the coarser material that contained most of the uranium minerals, thereby concentrating the uranium in the coarse fraction.

Thus, the present invention relates to a uranium beneficiation process comprising a hydrocyclone step to reject fine gangue material in order to enhance the subsequent separation of carbonate minerals from the uranium minerals. None of the processes known or used previously in the field comprises a process for producing a higher grade uranium feed stock (concentrate) for downstream leaching that involves the use of a hydrocyclone to reject the fine particulate components of a uranium ore to thereby enable effective separation of the carbonate minerals from the uranium minerals in a separating step, such as flotation, to facilitate uranium recovery.

Thus, in a first aspect the present invention relates to a beneficiation process for uranium ore comprising:
  performing a hydrocyclone step to produce an underflow fraction and an overflow fraction according to a size separation parameter, wherein the uranium is in particulate form and predominantly reports to the underflow fraction, and the overflow fraction contains fine particulate waste material; and
  treating the underflow fraction in a separation step to separate carbonate minerals from the uranium minerals.

In a preferred embodiment, the process of the invention further comprises a uranium recovery step after the separation step which comprises concentrating the uranium minerals in a low mass concentrate. The recovery step may comprise one or more conventional beneficiation processes, such as gravity or magnetic separation, or elutriation. The low mass concentrate may be fed to a leaching circuit to extract the uranium minerals. The leaching circuit may comprise an acid leach or an alkaline leach. In preferred embodiments, the leaching circuit comprises an acid leach.

In preferred embodiments, the hydrocyclone step is performed after a feed preparation step which comprises one or more of crushing, grinding, scrubbing, elutriation and screening the uranium ore before it is fed to the hydrocyclone.

Importantly, while it was known in the field that the uranium concentration of an ore varied with particle size, previously this information had only been used to concentrate the uranium by rejecting coarse size fractions, by methods such as screening and hydrocyclones, with the uranium reporting to the fine (overflow) fraction for further processing. The inventor recognised that there would be a significant advantage in removing the fine particulate material from uranium ores in order to subsequently enhance the separation of carbonate minerals present in the ore, as well as to improve other process steps. Thus, the present invention is premised on the realisation that, contrary to conventional practices and expectations, uranium minerals could be directed to the hydrocyclone underflow (coarse) fraction, thereby enabling fine particulate clays and other gangue fines to be rejected to the overflow (fine) fraction as waste.

Rejection of fine gangue particulate material increases the efficacy of subsequent mineral separation techniques such as flotation, gravity, and magnetic separation, in addition reducing slurry rheology in hydrocyclones, and reducing reagent consumption, which is particularly relevant for unit operations such as thickening and leaching.

Accordingly, in another embodiment the present invention relates to a beneficiation process for uranium ore comprising a hydrocyclone step that produces an underflow fraction and an overflow fraction according to a size separation parameter, wherein the uranium is in particulate form and predominantly reports to the underflow fraction, and the overflow fraction contains fine particulate waste material; and wherein the underflow fraction is subsequently treated in a flotation step to separate carbonate minerals from the uranium minerals.

In a further embodiment, the present invention relates to a process for producing a higher uranium grade feed stock for a leaching circuit that involves the rejection of the fine particulate components of a uranium ore in a hydrocyclone step, followed by separation of the carbonate minerals and uranium minerals by flotation. The uranium component from the separation step may be beneficiated further using known processes such as, for example, gravity or magnetic separation, or elutriation. The uranium concentrate may be fed to a leaching circuit for extraction of uranium minerals.

In another embodiment, the present invention relates to a process for improving the flotation performance of a uranium ore by removal of fine particulate matter, such as clay and other fine gangue material, which interfere with and hinder flotation. In accordance with this embodiment, the process of the present invention improves the selectivity and efficacy of a flotation process and thereby improves overall uranium recovery. Thus, the present invention enables the use of flotation to achieve effective separation of carbonate minerals and uranium minerals as part of the recovery circuit.

The separation step may comprise one or more flotation step(s). Thus, the flotation step may comprise flotation of carbonate minerals, flotation of the uranium minerals, silicate flotation, a bulk uranium/carbonate flotation, or any combination thereof, depending on the predominant minerals present in the ore and their associations. In preferred embodiments, the separation step may comprise a bulk flotation, i.e., the floating of uranium and carbonate minerals together, including as uranium/carbonate composites, to produce a bulk concentrate comprising uranium minerals and carbonate minerals. The bulk flotation may be followed by a subsequent uranium float or carbonate float.

In a preferred embodiment, a carbonate float is performed which produces a carbonate concentrate, and a flotation tail comprising uranium minerals. The uranium minerals may be recovered from the flotation tail by beneficiation to produce a uranium concentrate from which the uranium minerals may be extracted in a leaching circuit. In a preferred embodiment, the carbonate mineral comprises calcite and the separation step comprises a calcite float. In another embodiment, the carbonate mineral comprises dolomite and the separation step comprises a dolomite float. In a further embodiment the carbonate mineral comprises dolomite and the separation step comprises a uranium float.

In various embodiments the uranium minerals may occur as liberated grains and/or as composites with carbonate minerals ("uranium/carbonate composites"). Accordingly, in preferred embodiments the process may include one or more grinding step(s) to liberate the uranium minerals from the uranium/carbonate composites and thereby facilitate separation of the uranium minerals and carbonate minerals. In a preferred embodiment the process comprises a fine grinding step prior to the separation step. For example, the hydrocyclone underflow fraction may be finely ground according to a fine grinding parameter to break down uranium/carbonate composites and physically liberate the uranium mineral. After grinding the underflow fraction may optionally be subjected to a further hydrocyclone step to remove fines prior to proceeding to the separation step (e.g., by flotation). In other embodiments, a grinding step may be employed as part of the separation step. For example, in one embodiment the separation step may comprise a carbonate float wherein the resultant carbonate concentrate may be ground according to a fine grinding parameter to liberate uranium minerals from residual uranium/carbonate composites in the concentrate. The ground concentrate may then be recirculated to the carbonate flotation, preferably after being subjected to a cleaner float.

In further embodiments, a grinding step may be employed after a bulk uranium/carbonate float to liberate uranium minerals from uranium/carbonate composites in the bulk concentrate. The bulk concentrate may be subjected to a grinding step to liberate uranium minerals from uranium/carbonate composites, followed by an optional hydrocyclone step to reject fine waste material prior to a subsequent uranium float or a carbonate float to concentrate the uranium minerals.

The present invention is based upon an initial physical separation of particles using one or more hydrocyclone(s) operated to split a feed slurry at a selected size separation parameter, rejecting fine waste material in the hydrocyclone overflow, followed by a separation step to separate carbonate minerals from uranium minerals present in the hydrocyclone underflow. The invention can therefore be applied to any uranium ore provided it can be dispersed in the form of an aqueous slurry, and has a fine particle fraction and a carbonate component. Thus, the process of the invention allows a relatively low grade uranium ore, such as a calcrete hosted uranium ore (that may be sub-economic to process using conventional techniques) to be upgraded and leached in a commercially viable process. Examples of suitable ores include surficial uranium deposits, sandstone deposits and quartz pebble conglomerate deposits, among others. The uranium mineral(s) can be present in various forms including, for example, liberated uranium-bearing mineral, composites of uranium mineral and carbonate mineral(s) ("uranium/carbonate composites"), uranium associated or composite with silicates or sulphates, uranium composite or associated with other gangue minerals, or any combination thereof.

The hydrocyclone step can be carried out using commercial hydrocyclones generally available to the mineral processing industry. The size separation parameter determines the particle size at which the uranium ore feed slurry is split or 'cut' within the hydrocyclone into an overflow stream (containing particles having a size less than the size separation parameter) and an underflow stream (containing particles having a size greater than the size separation parameter and most of the uranium minerals). Those skilled in the art will readily be able to select a suitable size separation parameter taking into account the nature of the uranium ore to be processed and the flowsheet as a whole. In particular, a suitable size separation parameter may be determined based upon the uranium deportment as a function of the particle size as determined by QEMSCAN analysis or by a similar technique. Alternatively, those skilled in the art will recognise that a suitable size separation parameter may also be determined based upon a series of measurements of the proportion of uranium in the overflow compared to that in the underflow produced by passing a suitable slurry of uranium ore through a hydrocyclone configured and operated to produce different cut sizes (i.e., different size separation parameters). Those skilled in the art will recognise that the actual particle size of material that reports to the overflow fraction will depend not only upon the selected size parameter but also particle density, particle shape and other factors.

In accordance with embodiments of the present invention the hydrocyclone operating conditions are selected so that the particle size of the fine particulate material reporting to the hydrocyclone overflow is less than a selected 'cut' size (also referred to herein as the "size separation parameter"). In a preferred embodiment the size separation parameter is about 30 µm or less, or 25 µm or less, or 20 µm or less, or 10 µm or less, or 5 µm or less. Accordingly, in various embodiments, the size separation parameter may be about 4 µm, or about 5 µm, or about 6 µm, or about 7 µm, or about 8 µm, or about 9 µm, or about 10 µm, or about 15 µm, or about 20 µm, or about 25 µm or about 30 µm.

In a preferred embodiment, the proportion of material reporting to the hydrocyclone underflow is typically about 95% wt or less, about 90% wt or less, or about 85% wt or less, or about 80% wt or less, or about 75% wt or less, or about 70% wt or less, or about 65% wt or less, or about 60% wt or less of the ore fed to the hydrocyclone.

In accordance with the present invention uranium minerals, in the form of liberated grains or in the form of composites, predominantly report to the hydrocyclone underflow fraction, whilst fine-minerals such as clay, fine-grained carbonates, iron oxides (e.g., goethite) and the like are rejected to the overflow fraction as waste. The expression "predominantly report", and similar expressions, recognises that there may be some uranium present in particles smaller than the selected cut size and that, due to inefficiencies in the hydrocyclone performance, some particulate material coarser than a selected cut size may report to the hydrocyclone overflow, and some material finer than the cut size may report to the hydrocyclone underflow. Accordingly, the present invention also contemplates the use of multiple hydrocyclone stages (e.g., the use of two, three, four, five or more hydrocyclone stages) to remove material that is coarser than the cut size from the overflow of preceding hydrocyclones and to remove material that is finer than the cut size from the underflow of preceding hydrocyclones. When multiple hydrocyclone stages are employed, each hydrocyclone stage may be performed co-current or counter-current to a preceding hydrocyclone stage of counter-current hydrocyclones if required.

The overflow fraction containing the fine particulate material may be discarded as waste. Optionally, the hydrocyclone overflow fraction(s) may be fed to a cleaning stage to recover residual uranium minerals prior to disposal as a waste stream. The recovered uranium minerals may be recycled back to the process circuit.

The hydrocyclone step is carried out under conditions to maximise the movement of unwanted fine particulate material into the overflow fraction. Factors affecting the performance of a hydrocyclone include, but are not limited to, the physical hydrocyclone parameters such as diameter, vortex finder and spigot aperture, and the operating conditions of pressure, volume split to underflow and feed percent solids. It will be appreciated that these conditions can be selected or varied depending on the nature of the uranium ore to maximise the movement of unwanted fine particulate material to the overflow fraction while retaining uranium minerals in the underflow fraction for further processing. A person skilled in the art will recognise that varying these conditions may result in similar particle size separation by the hydrocyclone, e.g., increasing both the vortex finder and spigot diameters in proportion will likely produce a similar particle size.

According to one embodiment, the uranium ore is fed into the hydrocyclone as a suspension in water, forming a slurry. Uranium ore that has been prepared as a slurry in a feed preparation step e.g., by grinding and size separation, or wet scrubbing and size separation, is suitable feed material for the hydrocyclone. The water may be from various sources, including, for example, seawater, bore water or potable water. The density of the slurry material that is initially fed into the hydrocyclone can influence separation efficacy. Typically, the higher the viscosity of the feed material, the less efficient the separation process. In various embodiments, the solids feed density, i.e., the solids concentration of the slurry that is passed through the hydrocyclone (or the first or "primary" hydrocyclone in embodiments involving the use of multiple hydrocyclone steps), is in the range of about 0.1 wt % to about 20 wt %.

Those skilled in the art will readily be able to manipulate the density of the hydrocyclone feed material according to the properties and quantity of the particular ore to be processed. For example, additives or dispersants may be added to the water to alter the degree of dispersion of particles within the slurry. Suitable dispersants include chemicals for dispersion of particles in a slurry that are known to those skilled in the art and include but are not limited to low molecular weight polymers such as polyacrylates and polystyrene sulfonate, organic reagents such as carboxymethyl cellulose and dextrin, and inorganic reagents such as sodium pyrophosphate and sodium tripolyphosphate, among others. The composition and the dosage rate of the dispersant will depend on the solids matrix in the slurry and those skilled in the art can routinely determine an appropriate dispersant and dosage rate. The dispersion of the particles in the slurry may also be altered before processing by changing the pH of the slurry. This may be done with or without the addition of dispersants. Examples of suitable chemicals to alter the slurry pH are well known to those skilled in the art and include, for example, acids such as sulphuric, hydrochloric or nitric acids to make the slurry more acidic, or alkali substances such as calcium oxide, hydroxide or carbonate to make the slurry more basic.

In preferred embodiments, the uranium ore may be subjected to a feed preparation step. The feed preparation step may comprise one or more of crushing, grinding, scrubbing, elutriation and screening. The feed preparation step may be used to separate the hydrocyclone feed into two size fractions, with the smaller size fraction being fed to the hydrocyclone. This has the advantage of reducing the volume of material fed to the hydrocyclone step and less wear on equipment.

In preferred embodiments, the uranium mineral is selected from a uranyl vanadate or a uranyl phosphate. In preferred embodiments, the uranium mineral is selected from carnotite, tyuyamunite, torbernite, metatorbernite, autunite, and meta-autunite, or any mixture thereof. In a particularly preferred embodiment, the uranium mineral is carnotite or tyuyamunite.

In a preferred embodiment, the carbonate mineral comprises calcite, dolomite, siderite, ankerite and any combination thereof. In a particularly preferred embodiment, the carbonate mineral is calcite or dolomite, or a combination thereof.

In preferred embodiments, the separation step comprises one or more flotation step(s). The flotation step(s) can be chosen in accordance with the predominant uranium mineral and carbonate mineral present in the ore. In a preferred embodiment, the flotation step comprises a carbonate float. In another preferred embodiment the flotation step comprises a uranium float. In a further preferred embodiment the flotation step comprises a silicate float.

Various methods are well known to the skilled person that allow the flotation dynamics to be manipulated. By way of illustration, as calcite readily floats, depression of calcite and flotation of uranium mineral may not always be an effective or economically-viable option for separating the uranium fraction from a uranium mineral/calcite mixture. Accordingly, in ores containing predominantly calcite it may be preferable to use a calcite flotation step ahead of a uranium mineral concentration step. For ores in which dolomite is the main carbonate mineral, since dolomite is not as readily floatable as calcite, it may be preferable to float the uranium minerals away from the dolomite or alternatively float the dolomite away from the uranium minerals.

In a preferred embodiment, the carbonate minerals comprise calcite and the flotation step produces a carbonate concentrate comprising carbonate minerals and a flotation tail, wherein the uranium minerals predominantly report to the flotation tail. In an alternative embodiment the carbonate minerals comprise dolomite and the flotation step comprises a uranium float. According to this embodiment the flotation step produces a uranium concentrate comprising uranium minerals, and a flotation tail, wherein dolomite predominantly reports to the flotation tail. In a further alternative embodiment the carbonate minerals comprise dolomite and the flotation step comprises a carbonate float. According to this embodiment the flotation step produces a dolomite concentrate and a flotation tail, wherein the uranium minerals predominantly report to the flotation tail.

In some embodiments a grinding step may be employed at one or more different stages in the flowsheet to ensure liberation and efficient separation of carbonate minerals from uranium/carbonate composites.

Accordingly, in various embodiments the process may comprise a fine grinding step prior to the separation step. In such embodiments, the hydrocyclone underflow fraction is finely ground according to a fine grinding parameter to break down the uranium/carbonate composites and physically liberate the uranium mineral from the carbonate mineral. The fine grinding parameter may be selected according to the uranium mineral grain size and those skilled in the art can readily determine the appropriate fine grinding parameter according to the characteristics of the particular ore and the mineral associations. In preferred embodiments, the fine grinding parameter may be up to about 50 µm, or higher. In various embodiments, the fine grinding parameter is in a range from about 10 µm to about 50 µm. Thus, in various embodiments the fine grinding parameter may be about 10 µm, or about 15 µm, or about 20 µm, or about 25 µm, or about 30 µm, or about 35 µm, or about 40 µm, or about 45 µm, or about 50 µm. Those skilled in the art will recognise that following the grinding step, predominantly, but not necessarily, all of the uranium component may be in the form of liberated uranium bearing minerals, however, small proportions of uranium/carbonate composites may still remain.

In other embodiments, a pre-concentration step may be performed on the hydrocyclone underflow fraction prior to fine grinding ahead of the separation step. Performing a pre concentration step offers the advantage of reducing the volume of material to be ground in the fine grinding step. For example, a silicate flotation step may be performed to remove the silicate component (e.g., quartz, which typically may represent about 15% wt to about 50% wt of total mass) from the hydrocyclone underflow fraction, which may potentially reduce the mass for fine grinding to about 85% wt to about 50% wt, depending upon the mineralogy of the low grade uranium ore.

In another embodiment, the separation step comprises fine grinding of the carbonate flotation rougher concentrate to liberate any uranium/carbonate composites prior to a second flotation stage (cleaner flotation). (The term "rougher concentrate" refers to the concentrate from the first flotation stage). The uranium minerals liberated by the fine grinding will report in the cleaner flotation tail with the carbonate minerals reporting in the flotation concentrate. The cleaner flotation tail can then be returned to the rougher flotation feed.

Following the separation step, further beneficiation of the uranium bearing minerals to produce a higher grade uranium concentrate can be achieved using known processes. The further beneficiation step may comprise the use of one or more processes, such as for example, gravity or magnetic separation, or elutriation, which are well known in the field.

The uranium concentrate produced according to the present invention may be treated in a leaching circuit. The leaching circuit may comprise an alkali leach treatment or an acid leach treatment. Preferred embodiments of the present invention produce a uranium concentrate, low in carbonate minerals, that is suitable for acid leaching. Those skilled in the art will readily be able to select a suitable leaching circuit according to the composition of the uranium concentrate.

An alkali leach (required for uranium ore with a high carbonate concentration) is a more complex circuit and is typically conducted at least 90° C. over a period of about 24 hours. In contrast, an acid leach (suitable for a uranium ore with a low carbonate concentration) is typically performed at ambient temperature (e.g., about 20° C. to about 25° C.) over about a 6 to 10 hour period. An acid leach is a significantly lower cost and simpler process compared to an alkali leach. Accordingly, the beneficiation process of the present invention offers additional advantages by reducing the total amount of carbonate in the uranium concentrate to make it suitable for acid leaching. This in turn simplifies the extraction process and provides significant cost and environmental benefits.

The present invention offers significant advantages for the beneficiation of low grade uranium ores. Importantly, carbonate minerals are acid consumers and their presence in high proportions with uranium minerals dictates the use of the complex and high cost alkali leach process to extract uranium. Thus, an advantage of the present invention is that the rejection of fines in the hydrocyclone step enables the effective separation of carbonate minerals from the uranium minerals, and reducing the proportion of carbonate minerals in the leaching circuit enables the use of an acid leach circuit to extract uranium. The use of an acid leach circuit has substantial environmental and economic advantages compared to alkali leach circuits. The process of the present invention also reduces the mass of material ultimately fed to the downstream leaching circuit. This has the advantage of reducing the volume of the leaching circuit and reducing the alkaline or acid chemical reagents used for the uranium extraction process, which has significant environmental and economic advantages. The process of the invention therefore allows a relatively low grade uranium ore, such as a calcrete hosted uranium ore (that may be sub-economic to process using conventional techniques) to be upgraded and leached in a commercially viable process.

DESCRIPTION OF EMBODIMENTS OF THE INVENTION

In order that the beneficiation process of the present invention may be more clearly understood, preferred embodiments will be described with reference to the processing of a low grade uranium ore as depicted in FIGS. 1-5, which are flowsheets exemplifying presently preferred non-limiting embodiments of the invention.

Figure 1:
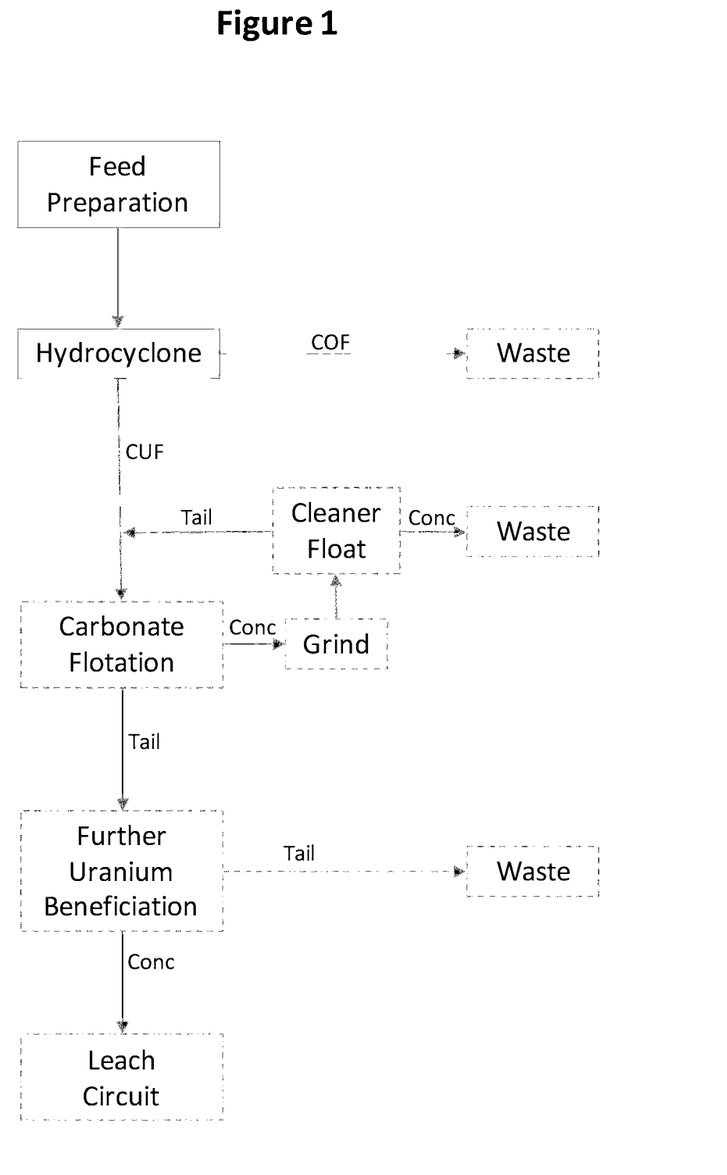
FIG. 1 is a flowsheet representing a presently preferred, non-limiting embodiment of the beneficiation process of the invention. Dotted lines (-----) indicate an optional step.

Flowsheet 1 shows a flowsheet for an ore containing predominantly liberated uranium and carbonate minerals. The flowsheet includes a grinding step on the carbonate float rougher concentrate according to a selected grinding parameter. The dotted line for the grind indicates that this grind step is optional, and is dependent on the mineral associations. The appropriate grinding parameter may be selected according to the mineral associations.

Figure 2:
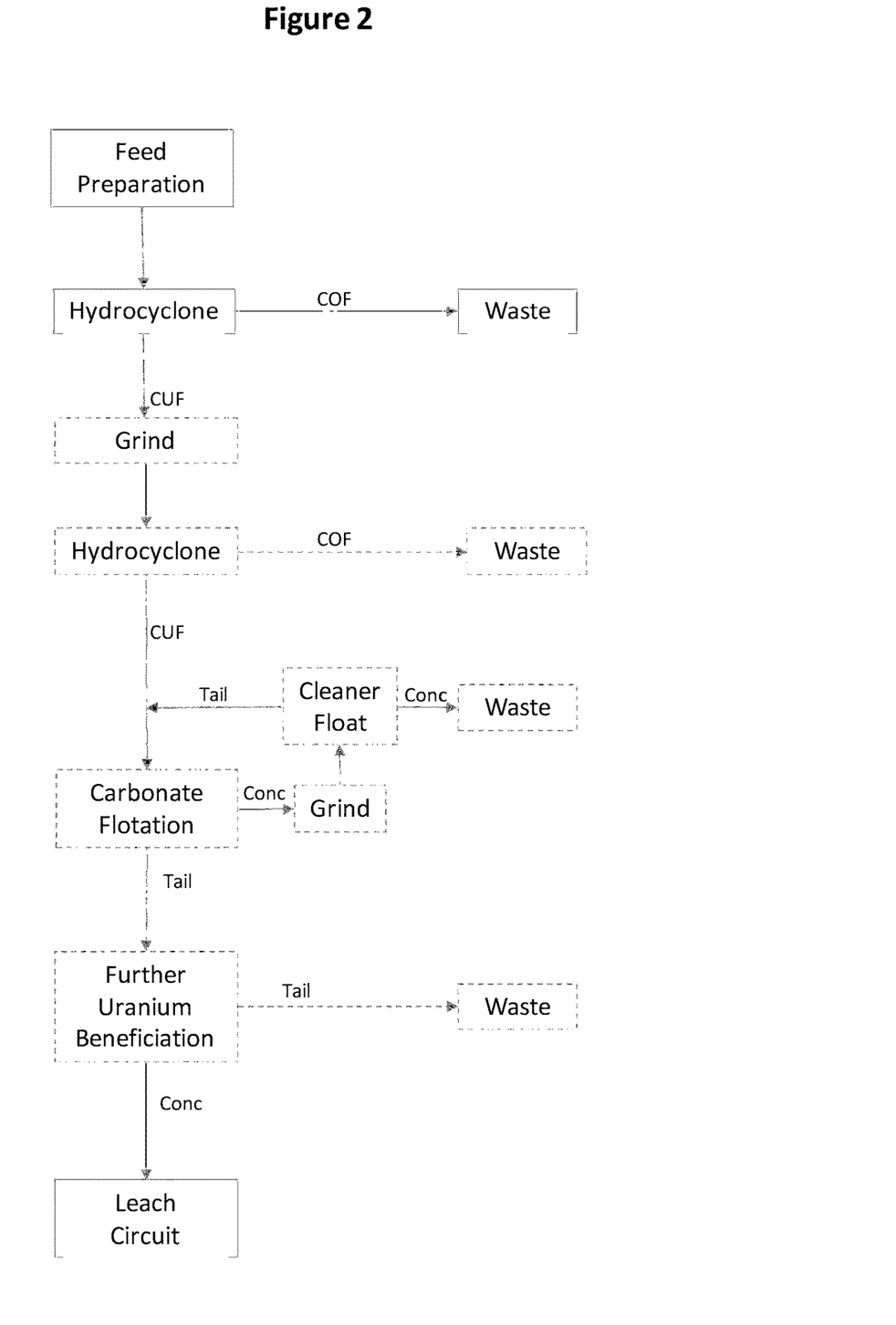
FIG. 2 is a flowsheet representing an alternative presently preferred, non-limiting embodiment of the beneficiation process of the invention. Dotted lines (-----) indicate an optional step.

Flowsheet 2 shows a flowsheet for an ore containing predominantly composite uranium and carbonate minerals in which the carbonate mineral is predominantly dolomite. A grind step is included on the hydrocyclone underflow to liberate the uranium and carbonate minerals prior to carbonate flotation. An optional hydrocyclone step can be included to remove fines, liberated during the grind step, prior to carbonate flotation.

Figure 3:
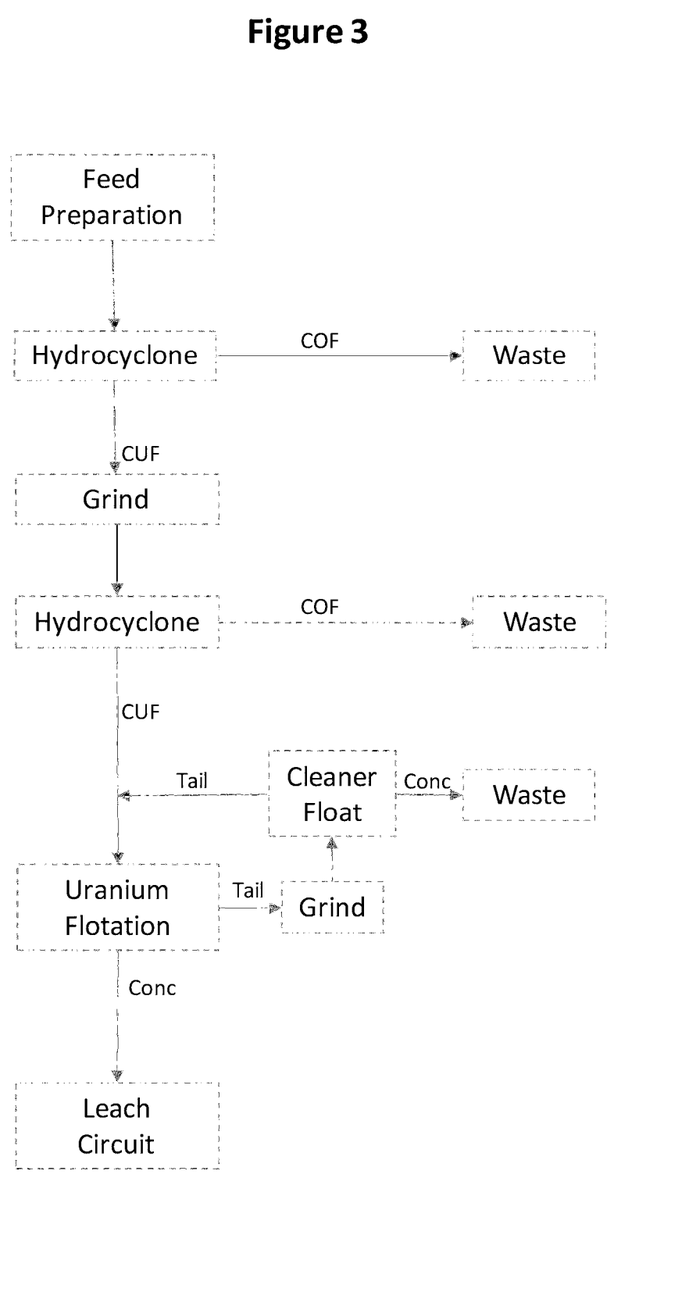
FIG. 3 is a flowsheet representing another presently preferred, non-limiting embodiment of the beneficiation process of the invention. Dotted lines (-----) indicate an optional step.

Flowsheet 3 is similar to flowsheet 2, but the carbonate flotation stage has been substituted with a uranium flotation stage.

Figure 4:
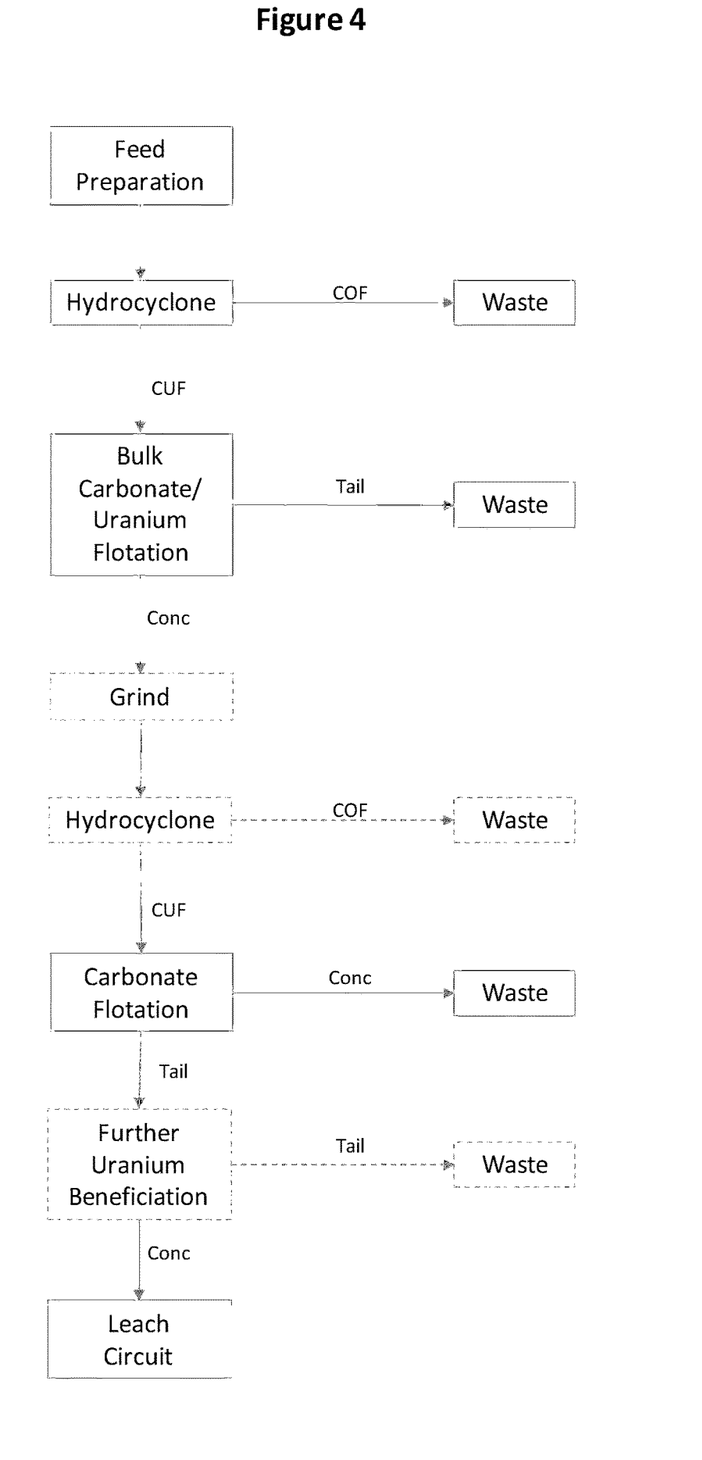
FIG. 4 is a flowsheet representing another presently preferred, non-limiting embodiment of the beneficiation process of the invention. Dotted lines (-----) indicate an optional step.

Flowsheet 4 is for an ore where the uranium minerals are predominantly composite with the carbonate minerals. The carbonate float stage recovers the carbonate and uranium minerals into a concentrate, prior to a grind step to liberate the minerals. Those skilled in the art will understand that the grind size will be dependent on the liberation size of the minerals. A carbonate flotation stage is completed on the grind product. An optional hydrocyclone step can be included to remove fines, liberated during the grind step, prior to carbonate flotation.

Figure 5:
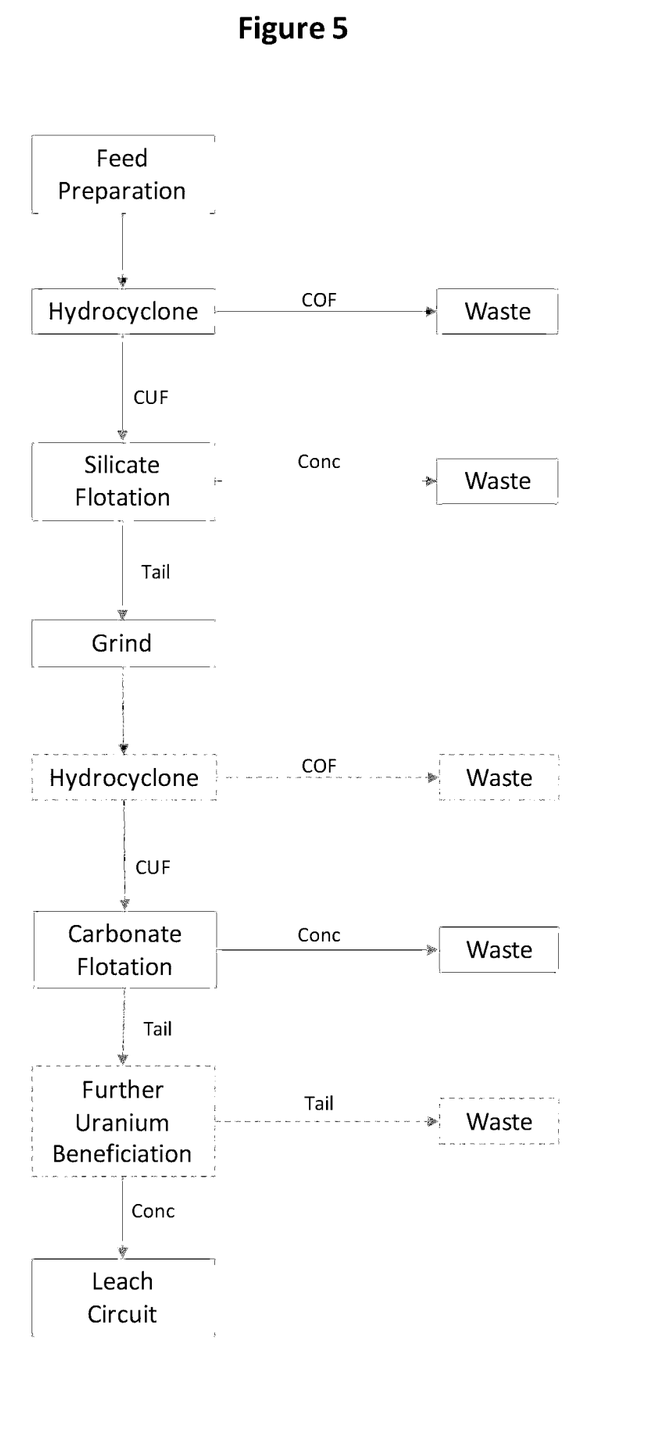
FIG. 5 is a flowsheet representing another presently preferred, non-limiting embodiment of the beneficiation process of the invention. Dotted lines (-----) indicate an optional step.

Flowsheet 5 is similar to flowsheet 4, but for the substitution of the bulk carbonate uranium flotation stage with a silicate flotation stage. A further substitution in this flowsheet could be a uranium flotation stage substituting the carbonate flotation stage.

EXAMPLES

The invention will now be illustrated by reference to the following non-limiting examples.

Example 1

Two calcrete uranium ores, both containing carnotite as the only uranium mineral, were crushed to less than 2 mm then prepared as a 50 wt % slurry in Perth tap water. After screening each at 38 μm, the undersized material was passed at a solids density of about 0.1 wt % through a laboratory-scale Warman cyclosizer to produce the size fractions shown in Table 1. The results from chemical analysis of the −C5 size fraction are shown in Table 2 for both Ore 1 and Ore 2.

TABLE 1

Typical size fractions from a Warman cyclosizer.

| Hydrocyclone stream | Termed | Size fraction |
|---|---|---|
| First hydrocyclone underflow | C1 | >38 μm |
| Second hydrocyclone underflow | C2 | 29 to 38 μm |
| Third hydrocyclone underflow | C3 | 21 to 29 μm |
| Fourth hydrocyclone underflow | C4 | 14 to 21 μm |
| Fifth hydrocyclone underflow | C5 | 10 to 21 μm |
| Fifth hydrocyclone overflow | −C5 | <10 μm |

TABLE 2

Mass distribution and uranium distribution for the −C5 fraction produced by passing Ore 1 and Ore 2 through a Warman cyclosizer. Note that the percentages are expressed as a function of the total sample (i.e., material less than 2 mm).

| Source | Mass (<10 μm) (%) | Uranium Dist (wt %) |
|---|---|---|
| Ore 1 −C5 fraction (<10 μm) | 16 | 20 |
| Ore 2 −C5 fraction (<10 μm) | 20 | 23 |

Analysis of this data could suggest that the uranium losses from a hydrocyclone separation at about 10 μm would be about 20 wt % for Ore 1 and about 23 wt % for Ore 2. This would generally be considered much too high and therefore fine particle separation by a hydrocyclone would be dismissed as a viable process unit operation because of the associated uranium losses.

Both Ore 1 and Ore 2 were analysed using QEMSCAN to determine the carnotite grain size. The results are shown in Table 3.

TABLE 3

Mass distribution of carnotite in Ore 1 and Ore 2 as a function of grain size as determined by QEMSCAN.

| Source | Carnotite Grain Size | Weight Percent |
|---|---|---|
| Ore 1 | <30 μm | 78 |
|  | <10 μm | 11 |
|  | <6 μm | 3 |
| Ore 2 | <30 μm | 94 |
|  | <10 μm | 19 |
|  | <6 μm | 4 |

The QEMSCAN analysis showed that very little of the carnotite present in both Ore 1 and Ore 2 had a grain size below about 6 μm, providing the insight that rejection of material less than 6 μm would not result in significant loss of uranium.

The −125 μm fraction from Ore 1 and Ore 2 was passed through a hydrocyclone set up to achieve size separation at about 4 μm for Ore 1 and about 6 μm for Ore 2, based upon a particle density of 2.5 g cm$^{-3}$. The conditions for each hydrocyclone test are shown in Table 4.

TABLE 4

Test conditions used to process the −125 μm fraction from Ore 1 and Ore 2.

| Conditions | Ore 1 | Ore 2 |
|---|---|---|
| Feed density (wt %) | 5 | 3 |
| Mozley hydrocyclone diameter (mm) | 25 | 25 |
| Pressure (psi) | 73 | 51 |
| Vortex finder diameter (mm) | 3.0 | 5.5 |

TABLE 4-continued

Test conditions used to process the −125 μm fraction from Ore 1 and Ore 2.

| Conditions | Ore 1 | Ore 2 |
|---|---|---|
| Spigot diameter (mm) | 3.2 | 3.2 |
| Size separation parameter (μm) | ~4 | ~6 |
| Hydrocyclone pass | single | single |

The results shown in Table 5 were obtained.

TABLE 5

Weight distribution and uranium distribution in the hydrocyclone overflow for Ore 1 and Ore 2. Note that percentages are expressed as a function of the hydrocyclone feed.

| Source | Size fraction | Mass (%) | Uranium Dist (wt %) |
|---|---|---|---|
| Ore 1 | <~4 μm | 10 | 6 |
| Ore 2 | <~6 μm | 31 | 8 |

For both Ore 1 and Ore 2 it was found that a significant amount of the mass could be rejected in the hydrocyclone overflow, without significant uranium losses. For Ore 1, the hydrocyclone overflow fraction (i.e., material less than about 4 μm) comprised 10 wt % of the mass, but only 6 wt % of the uranium. For Ore 2, the hydrocyclone overflow (i.e., material less than about 6 μm) comprised 31 wt % of the mass, but only 8 wt % of the uranium. This indicated that it was feasible to split a uranium ore at a very fine size using a hydrocyclone and recover a very high proportion of the uranium values in the underflow fraction.

Example 2

Ore 1 was wet scrubbed and screened at 125 μm with the −125 μm slurry used as the feed to the hydrocyclone tests. Tests were completed in Perth tap water with the following conditions:
  25 mm diameter Mozley hydrocyclone
  500 kPa (73 psi) operating pressure
  3.0 mm diameter vortex finder
  3.2 mm diameter spigot
  ~4 μm size separation parameter
  Single pass
  −125 μm feed size The results from passing Ore 1 through the hydrocyclone set up to split the slurry at about 4 μm are shown in Table 6.

TABLE 6

Weight distribution, uranium grade and uranium distribution in the overflow produced after passing a −125 μm slurry of Ore 1 at two densities through a hydrocyclone set up to split at about 4 μm.

| | Hydrocyclone Overflow* | | |
|---|---|---|---|
| Feed Density (wt %) | Wt (%) | U Grade (ppm) | U Dist (%) |
| 5 | 15 | 97 | 8 |
| 2.5 | 11 | 56 | 3 |

*Percentages are expressed as a function of the hydrocyclone feed.

The results demonstrate that the density of the slurry feed has an effect on the efficacy of the hydrocyclone's performance.

Example 3

The −125 μm slurry of the Ore 1 sample was tested according to the procedures detailed in Example 2, but for a reduction in the operating pressure to 276 kPa (40 psi).

The results given in Table 7 below, when compared to the results in Table 6, show that the lower pressure reduces the mass of material reporting in the hydrocyclone overflow.

TABLE 7

Weight distribution, uranium grade and uranium distribution in the overflow produced after passing a slurry of Ore 1 through a hydrocyclone.

| | Hydrocyclone Overflow* | | |
|---|---|---|---|
| Feed Density (wt %) | Wt (%) | U Grade (ppm) | U Dist (%) |
| 5 | 8 | 116 | 4 |

*Percentages are expressed as a function of the hydrocyclone feed.

Example 4

The procedure used in Example 2 to generate the −125 μm slurry samples was used in Example 4, but Indian Ocean sea water from the Perth region was used rather than Perth tap water. The hydrocyclone conditions used were as given in Example 3, but four co-current stages were used in this example.

The results given in Table 8 below show that the hydrocyclone separation is effective in high salt content water (sea water) as well as fresh water (tap water).

TABLE 8

Influence of water quality on the overall weight distribution, uranium grade and uranium distribution in the overflow produced after passing a −125 μm slurry of Ore 1 through four hydrocyclones operated co-currently and set up to split at about 4 μm.

| | Hydrocyclone Overflow* | | |
|---|---|---|---|
| Water Type | Wt (%) | U Grade (ppm) | U Dist (%) |
| Perth tap water | 21 | 120 | 10 |
| Sea water | 27 | 125 | 14 |

*Percentages are expressed as a function of the hydrocyclone feed.

Example 5

Ore 2 was ground to 400 μm and screened at 125 μm with the −125 μm fraction used as the feed for the hydrocyclone tests. Two hydrocyclones were used configured such that the overflow from hydrocyclone 1 (referred to as the Rougher hydrocyclone) was the feed to hydrocyclone 2 (referred to as the Cleaner hydrocyclone).

Tests were completed in Perth tap water with the following conditions:
  25 mm diameter Mozley hydrocyclone
  350 kPa (51 psi) operating pressure
  5.5 mm diameter vortex finder
  3.2 mm diameter spigot
  ~6 μm size separation parameter
  3 wt % feed density to Rougher test
  Single pass each stage The results presented in Table 9 below show that a high percentage of the mass feeding the hydrocyclone can be rejected, and that the rejected fraction contains only a small percentage of the uranium.

TABLE 9

Weight distribution, uranium grade and uranium distribution in the Rougher and Cleaner overflows produced after passing a slurry of Ore 2 through two hydrocyclones set up to split at about 6 μm.

| Test | Feed Density (wt %) | Hydrocyclone Overflow | | |
|---|---|---|---|---|
| | | Wt (%) | U Grade (ppm) | U Dist (%) |
| Rougher* | 3 | 28 | 150 | 6 |
| Rougher + Cleaner[1] | — | 24 | 125 | 4 |

*Percentages are expressed as a function of the hydrocyclone feed.
[1]Percentages are expressed as a function of the hydrocyclone rougher feed

Example 6

A −125 μm size fraction of Ore 1 was used as the feed material in a laboratory carbonate flotation test conducted in an Agitair cell. Two tests were conducted. The first used the −125 μm size fraction of Ore 1. The second used the underflow after four stages of hydrocyclone treatment of the −125 μm size fraction of Ore 1 (i.e., the underflow from the first hydrocyclone was passed through a second hydrocyclone, then the underflow from the second hydrocyclone was passed through a third hydrocyclone, and then the underflow from the third hydrocyclone was passed through a fourth hydrocyclone). Each hydrocyclone was set up to achieve size separation at about 6 μm.

The conditions used and the results obtained are shown in Table 10. The results from the first calcite flotation test (done without a hydrocyclone step) shows a reasonable calcite recovery (92.3%) in the flotation concentrate, however the flotation concentrate contained an unacceptably high level of the uranium (29.2%). The results obtained after four hydrocyclone stages were much improved, with 94.4% of the calcite recovered in the flotation concentrate but with only 16.9% of the uranium. In addition, when the calcite flotation was performed without the hydrocyclone stage, 16 times more reagent was required.

TABLE 10

Flotation results without a hydrocyclone stage and after four hydrocyclone stages using the −125 μm fraction of Ore 1. (Percentages are expressed as a function of the flotation feed).

| | No Hydrocyclone Stage | 4 Hydrocyclone Stages |
|---|---|---|
| Reagents | | |
| Sodium Silicate (g/t) | 2,000 | — |
| Dextrin (g/t) | 2,000 | — |
| Sodium Oleate (g/t) | 3,000 | 440 |
| Total Reagents (g/t) | 7,000 | 440 |
| Rougher Concentrate | | |
| Calcite Recovery (%) | 92.3 | 94.4 |
| Uranium Recovery (%) | 29.2 | 16.9 |

Table 11 shows the results from calcite flotation tests conducted on the −38 μm fraction of Ore 1 after either one hydrocyclone stage or four hydrocyclone stages. Each hydrocyclone was set up to achieve size separation at about 6 μm. After one hydrocyclone stage the calcite recovery was only 75.2% and the uranium recovery was high at 32.6% in the flotation concentrate. In comparison, after four stages, the calcite recovery was 96.4% and the uranium recovery was 20.0% in the flotation concentrate. In addition, three reagents were required in the one hydrocyclone stage test at a total dosage of 2,060 g/t, whereas a single reagent could be used in the test after four stages at a total dosage of 360 g/t. Thus, four hydrocyclone stages were more effective with far less reagent than a single hydrocyclone stage.

TABLE 11

Flotation results with a single hydrocyclone stage and after four hydrocyclone stages using the −38 μm fraction of Ore 1. (Percentages are expressed as a function of the flotation feed).

| | 1 Hydrocyclone Stage | 4 Hydrocyclone Stages |
|---|---|---|
| Reagents | | |
| Sodium Silicate (g/t) | 460 | — |
| Dextrin (g/t) | 1,000 | — |
| Sodium Oleate (g/t) | 600 | 360 |
| Total Reagents (g/t) | 2,060 | 360 |
| Rougher Concentrate | | |
| Calcite Recovery (%) | 75.2 | 96.4 |
| Uranium Recovery (%) | 32.6 | 20.0 |

It will be appreciated by persons skilled in the art that numerous variations and/or modifications may be made to the invention as shown in the specific embodiments without departing from the spirit or scope of the technology as broadly described. The present embodiments are, therefore, to be considered in all respects as illustrative and not restrictive.

The invention claimed is:
1. A beneficiation process for uranium ore comprising:
performing a beneficiation hydrocyclone step to produce an underflow fraction and an overflow fraction according to a size separation parameter, wherein uranium values are in particulate form and predominantly reports to the underflow fraction for further processing, and the overflow fraction contains fine particulate waste material; and
treating the underflow fraction in a separation step to separate carbonate minerals from uranium minerals.
2. The process according to claim 1, wherein the separation step comprises one or more flotation step(s).
3. The process according to claim 1, wherein the carbonate minerals are selected from calcite, dolomite, siderite, ankerite, and any combination thereof.
4. The process according to claim 1, wherein the separation step comprises a carbonate float, a uranium float, a silicate float or a bulk uranium/carbonate float, or any combination thereof.
5. The process according to claim 4, wherein the separation step comprises a carbonate float that produces a carbonate concentrate comprising carbonate minerals, and a flotation tail comprising uranium minerals.
6. The process according to claim 4, wherein the separation step comprises a uranium float that produces a uranium concentrate comprising uranium minerals, and a flotation tail comprising carbonate minerals.
7. The process according to claim 4, wherein the separation step comprises a bulk uranium/carbonate float that produces a uranium/carbonate concentrate, and optionally wherein the uranium/carbonate concentrate is subjected to a carbonate float or a uranium float.

8. The process according to claim 1, wherein the separation step comprises a silicate float followed by a carbonate float or a uranium float of a silicate float tail.

9. The process according to claim 1, further comprising one or more grinding step(s).

10. The process according to claim 9, wherein the underflow fraction is subjected to a grinding step prior to the separation step.

11. The process according to claim 10, wherein the underflow fraction after grinding is subjected to a further hydrocyclone step prior to the separation step.

12. The process according to claim 7, wherein the uranium/carbonate concentrate is subjected to a grinding step prior to the carbonate float or uranium float.

13. The process according to claim 1, further comprising a uranium recovery step comprising concentrating the uranium minerals in a low mass concentrate.

14. The process according to claim 13, wherein the recovery step comprises one or more beneficiation steps selected from gravity separation, magnetic separation and elutriation.

15. The process according to claim 1, further comprising extracting the uranium minerals in a leaching circuit.

16. The process according to claim 15, wherein the leaching circuit comprises an acid leach.

17. The process according to claim 1, wherein the size separation parameter of the hydrocyclone is about 30 gm or less.

18. The process according to claim 1, comprising two or more hydrocyclone steps.

19. The process according to claim 1, wherein the beneficiation hydrocyclone step is performed after a feed preparation step, wherein the feed preparation step comprises one or more of crushing, grinding, scrubbing, elutriation and screening the uranium ore before it is fed to a hydrocyclone.

* * * * *